Feb. 17, 1953   R. B. BROWN   2,629,032
SCALE CONTROL SWITCH
Filed Oct. 31, 1947   2 SHEETS—SHEET 1
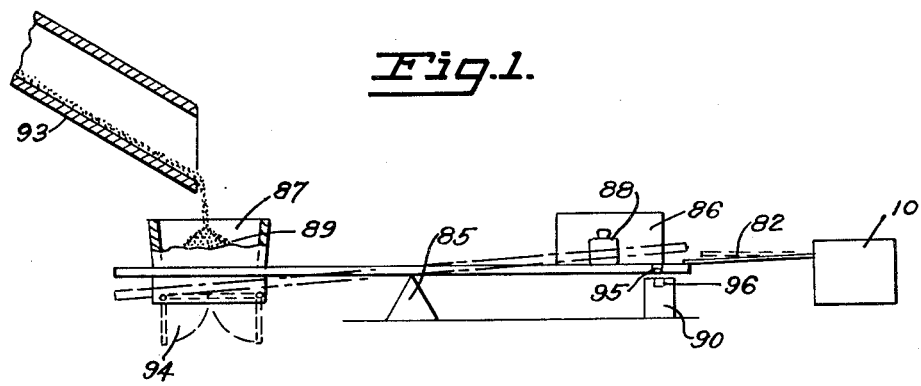
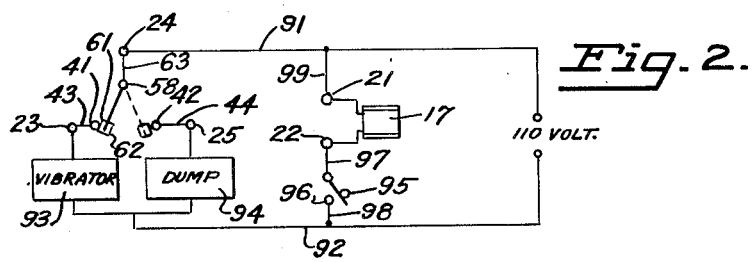
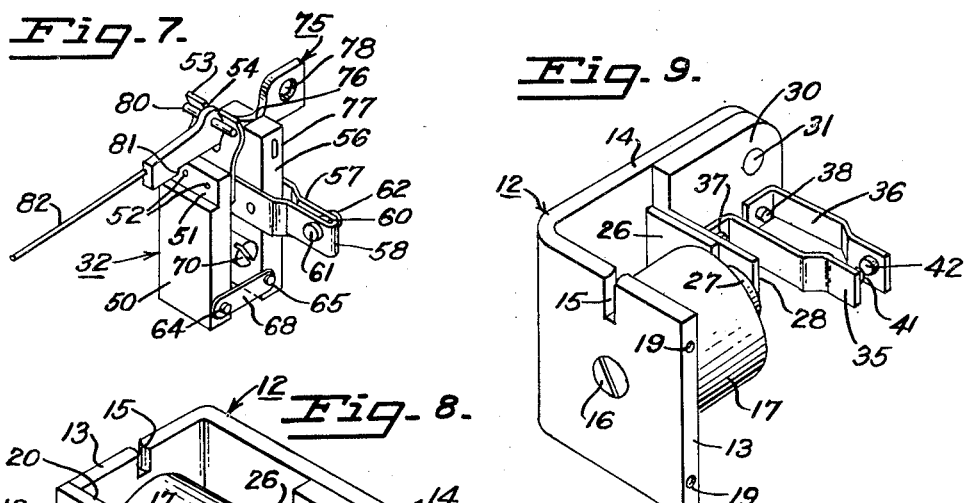
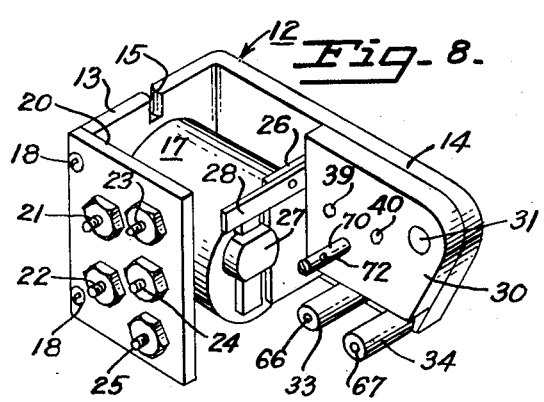
INVENTOR
ROBERT B. BROWN
BY
ATTORNEY

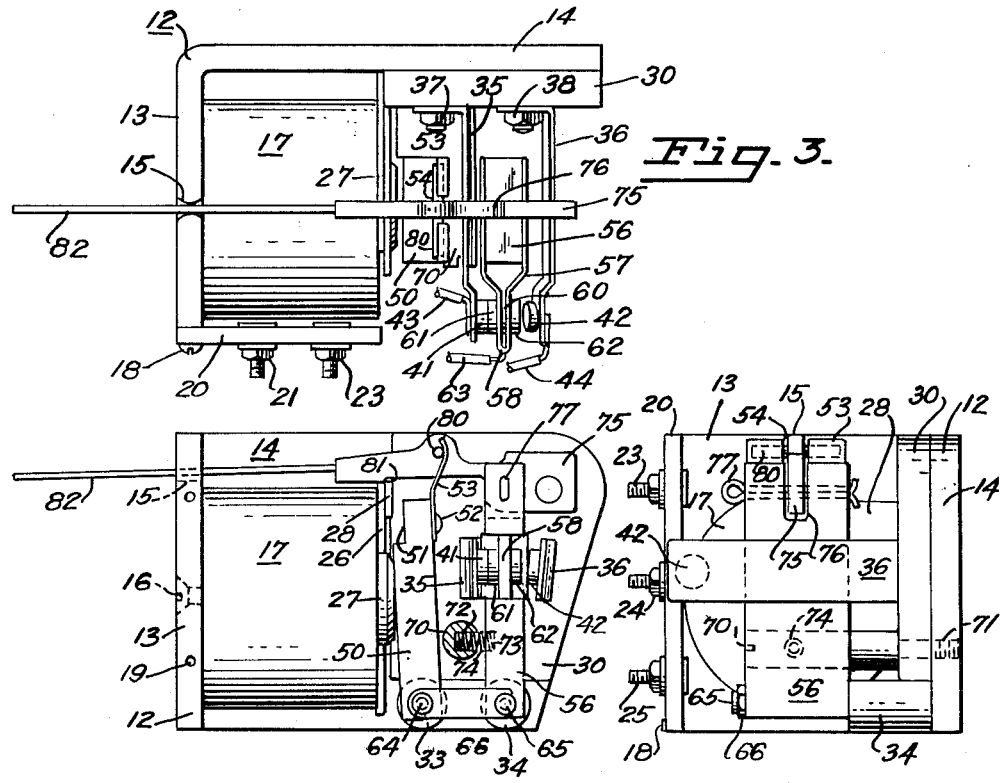
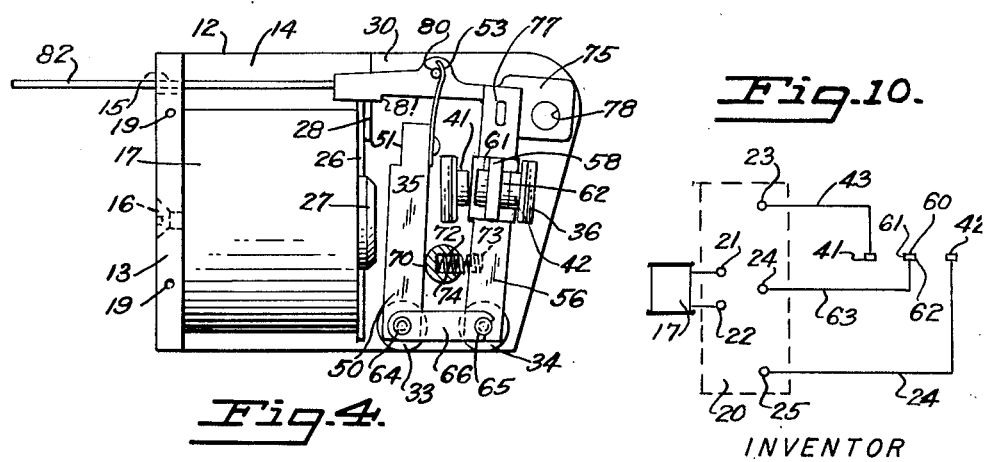

Patented Feb. 17, 1953

2,629,032

UNITED STATES PATENT OFFICE 2,629,032

SCALE CONTROL SWITCH

Robert E. Brown, San Francisco, Calif., assignor to T. R. Mantes, doing business as T. R. Mantes Company, San Francisco, Calif.

Application October 31, 1947, Serial No. 783,399

12 Claims. (Cl. 200—87)

This invention relates to an improved electromechanical control switch, especially suitable for use on automatic weighing or measuring devices.

When a scale, balance, or other weighing, measuring or counting device is made automatic, problems of accuracy and durability arise which are not present in hand-operated devices. For example, if a scale is constructed so as to trip a control lever when a certain weight is reached, the inertia of the lever adds to the weight of the scale, and if the inertia is not uniform or varies with time or weather, it may vitiate the accuracy of the scale. Very sensitive lever systems and other control means are usually delicate and not suitable for continuous, large-scale rapid operation. Moreover, the more complicated the lever system is made so as to reduce the inertia of operation, the more parts there are to get out of repair or out of adjustment. Even microswitches of the usual type require a force of about two ounces for operation, an amount which is appreciably detrimental to the accuracy of sensitive weighing instruments.

What has been needed is an efficient, rugged control means which requires less than 1/60 of an ounce of force to operate it, and this invention provides a switch meeting these requirements, as well as solving the problems heretofore encountered.

One object of this invention is to provide a mechanically-controlled switch which can be actuated by a force of very small magnitude.

Another object of this invention is to provide a scale-controlled switch with a control arm which quickly retracts out of the way when the switch is thrown so that the actuating balance arm may harmlessly swing past it.

Another object of the invention is the provision of a lever and switch actuating linkage to produce a positive lock with a minimum of force, and in which even that original locking force is not present when the lever is being tripped to unlock the lever.

Another object of this invention is to provide a scale-control switch which may readily be utilized with many existing types of scales, balances, and other devices.

Another object of this invention is to provide a control mechanism which works accurately whether large or small quantities are being measured.

Another object of this invention is to provide a compact, simply-constructed control-switch.

A further object of the invention is to provide a control-switch which will respond rapidly and accurately to very small actuating forces without significant interference with the controlled device.

A further object of this invention is to provide a control device, two or more of which can be used together to control a complicated series of responses and operations.

Still other objects of the invention are to provide a scale control-switch which can be used in a variety of positions and which is rugged so that it can be used for a long series of quickly-repeated operations and still maintain its accuracy without intermediate adjustment.

Other objects and advantages of this invention will appear from the following detailed description of a specific embodiment, given in accordance with U. S. Revised Statutes Section 4888. The appended claims, however, are not intended to be limited to this specific embodiment.

In the drawings:

Fig. 1 is a diagrammatic view showing how a control mechanism embodying the invention may be used to control the feeding and dumping operations of a balance;

Fig. 2 is a circuit diagram showing one possible type of circuit for which the control mechanism is particularly adapted;

Fig. 3 is a top plan view of the scale control mechanism, showing the control finger is in its retracted position;

Fig. 4 is a view in side elevation of the control mechanism with the control finger in retracted position and with the binding posts removed to show the interior structure more clearly;

Fig. 5 is a view in side elevation, similar to Fig. 4, with the control finger in its locked and advanced position;

Fig. 6 is a view in rear elevation of the control mechanism;

Fig. 7 is a view in perspective of an assembly of the moving parts of the control switch;

Fig. 8 is a view in perspective of some of the stationary parts of the control mechanism;

Fig. 9 is a view in perspective, taken from a different viewpoint from that in Fig. 8; some of the parts shown in Fig. 8 are removed, and some other parts are shown which were not shown in Fig. 8; and Fig. 10 is an internal circuit diagram of the switch.

The switch device is comprised of the following principal elements: an electromagnet 17, an armature 50 pivoted nearby to be attracted by the magnet 17, a fork 53 on the moving end of the armature 50, a pivoted switch arm 56 mounted nearby to the armature 50 and preferably generally parallel to it, a lever 75 pivoted to the moving end of the switch arm 56 and extending between and beyond the fork 53 on the armature 50, a pin 80 passing through the lever 75 near the fork 53 so the fork 53 will engage the pin 80 and move the pawl 81 on the lever 75 into locked engagement with the latch bar 28 whenever the magnet 17 is energized, a spring 74 engaging the switch arm 56 to retract the lever 75 whenever its pawl 81 is unlocked from the latch bar 28, and switch contacts 35, 36 engaged by the switch arm 56 in its two positions.

By having the pivot point 77 of the lever 75, and the latch bar 28 mounted below the pin 80 on the lever 75, the pressure applied by the fork 53 when the magnet 17 is energized will produce a force acting to press the lever 75 down against the latch bar 28 and will cause the pawl 81 to drop behind the latch bar 28 without the aid of any spring pressure. The instant the magnet 17 is de-energized with the pawl 81 in locked position, the only force to be overcome to unlock the lever 75 is the friction between the latch bar 28 and the pawl 81.

This structure achieves the certainty of a positive locking from the force of the magnet itself and leaves the lever free of any force tending to keep it locked, except for the friction just mentioned.

This is important in weighing devices where the actuating force available on the scale beam is small, and particularly where the materials being weighed are very light and they are being weighed out in small quantities.

By having the lever 75 mounted on the end of the switch arm 56, the instant its pawl 81 is unlocked from the latch bar 28, the lever 75 is retracted and, as shown in Fig. 1, will get out of the way of the scale beam if the latter continues to move upward, as it does on most scales. The lever 75 does not move out to its extended position until the scale beam has fallen and is ready for another weighing cycle.

A more detailed description of a sample circuit and of the illustrative embodiment follows:

The housing 12 and the stationary parts of the switch are shown in Figs. 8 and 9. The entire device, except for the protruding control finger 82, may be enclosed, which may be made to present a pleasing appearance. However, the case has not been shown here, in order that the working parts may be better illustrated.

All the working parts are supported, directly or indirectly, by the housing 12, which is an L-shaped member having two arms 13 and 14. The arm 13 is notched at its top center, the notch 15 being sufficiently wide and deep to give play to the lever finger 82 which passes through it. The arm 13 is perforated at about its center by the bolt 16, which holds the solenoid 17.

At the end of the arm 13, the bolts 18 are threaded into the taps 19 and hold the control board 20, a flat plate of insulating material. The board 20 is perforated by five binding posts 21, 22, 23, 24 and 25, to which all the interior and exterior wiring of the switch are fastened.

The binding posts 21 and 22 are connected by lead wires (not shown) to the opposite ends of the electromagnet 17. In addition to being supported by the bolt 18, the electromagnet 17 is steadied by plate 26, which may be welded to the contact point 27 of the electromagnet 17 and which bears against the plate 14 and abuts the edge of the plate 30. This support plate 26 also supports the latch plate 28, which is used to lock the switch in its forward position in a manner which will be subsequently described.

The plate 30, made of an insulating material, may be held by the rivet or bolt 31 to the arm 14. This plate 30 supports the stationary elements of the switch. Below the plate 30 the two lugs 33 and 34 project from the arm 14. These lugs 33 and 34, which may be made integral with the arm 14 or may be made separately and riveted to it or threaded in it, serve as pivot bearings which support the movable parts of the switch assembly 32.

The two metal brackets 35 and 36 are held on the insulating plate 30 by the bolts 37 and 38, which thread into the taps 39 and 40, respectively. Near the extremities of the brackets 35 and 36, respectively, and facing each other, are the contact points 41 and 42. The brackets 35 and 36 are thus the opposing stationary switch elements. The wire 43 may connect the contact point 41 to the binding post 23, and another wire 44 may connect the contact point 42 to the binding post 25.

The moving parts 32 of the switch are separately illustrated in perspective in Fig. 7. The armature 50 is made of a ferromagnetic material so that it can be magnetically attracted against the contact point 27 when current flows through the electromagnet 17. The top of the armature 50 is preferably offset at 51 so that the latch plate 28 will not prevent the body of the armature 50 from making contact against the point 27. Rivets or bolts 52 hold the curved, forked pusher 53 near the top of the armature 50. The vertical notch 54 in the top of the pusher 53 is wide enough to give the lever 75 free play.

The swinging pivot piece, or movable switch element 56 is made of an insulating material. Around it is fastened a U-shaped bracket 57, made of a conducting metal, such as copper. The bracket 57 is narrower at its tip 58 which extends out past the pivot member 56 and is there perforated by the brass pin 60 which forms the contact points 61 and 62 on each side of the tip 58. In the completed switch, these contact points 61 and 62 fit opposite the contact points 41 and 42, respectively. The lead wire 63 then connects the tip 58 and its contact points 61 and 62, to the binding post 24.

The armature 50 and the pivot member 56 are perforated near their bases by the pivot pins 64 and 65, respectively. When the switch assembly 32 is installed, these pins 64 and 65 fit into the recesses 66 and 67, respectively, of the lugs 33 and 34, and provide the pivots about which both the armature 50 and the member 56 can swing. A small link plate 68 grounds the pins 64 and 65 together and limits the forward movement of the armature 50 and the switch center plate 56.

Between the armature 50 and the swinging member 56, when they are installed, is a small keyed rod 70 which is threaded into the tap 71 through the plate 30 and the arm 14. In the side of the rod 70 which is to lie opposite the member 56 is a cylindrical recess 72, and the member 56 is similarly recessed at 73, directly opposite the recess 72. The coil spring 74 fits into these recesses 72 and 73 and is held between them. The function of the spring 74 is to urge the plate 56 normally against the contact point 42.

The lever 75, which joins the armature 50 and the member 56 in tandem, is preferably pivoted on the cotter pin 77 in the notch 76 through the member 56, and the lever 75 may freely rotate about it. The lever 75 may be shaped substantially as shown, but many features of this shape are not critical. It is not necessary, for example, to provide a cut-out portion 78.

Forward from the pivot plate 56 and a substantial height above the cotter pin 77 is the pin 80. This pin 80 is engaged and pulled forward by the forked pusher 53 when the armature 50 is attracted against the contact point 27. The relative position of the pin 80 above the cotter pin 77 gives a bell crank effect, so that when the pusher 53 brings the pawl 81 on the lever 75 forward, it also pushes it down so that it may lock against the latch plate 28. The loose connection between the pusher 53 and lever 75 enables the lever 75 to remain unaffected when the armature 50 falls back away from the electromagnet 17, as it will do when the switch is mounted in certain attitudes.

The release pin or finger 82 projects out from the front of the lever 75 through the groove 16 in the plate 12. A slight upward pressure—less than 1/60 ounce—on the finger 82 releases the pawl 81 from the latch 28, and if there is no current passing through the solenoid 17, the coil spring 74 will bring the lever 75 back, retracting the finger 82.

Fig. 1 shows a typical physical installation of such a unit on a balance-type scale. The control box 10 is placed in such a relation to the scale 85 that when the finger 82 is in its advanced position, it rests on the top edge of the balance pan 86 which holds the weights 88. When the weight of the material 89 in the other balance pan 87 becomes greater than the weight 88 in the pan 86, the pan 87 sinks with its load, and the balance pan 86 rises from its rest 90 and pushes up against the finger 82. This upward pressure releases the pawl 81 from the latch 28, and the lever 75 quickly retracts, pulling the finger 82 out of the way. The pan 86 may then swing on upward without any interference from, or danger to, the finger 82.

Fig. 2 illustrates one type of electrical circuit in which the scale-control switch may be used to control the weighing operation automatically. The binding post 24 is connected by the wire 63 to contact points 41 and 42. The wire 91 leads from the post 24 to one side of a 110 volt A. C. line. The other side 92 of the A. C. line is connected in parallel to the vibrator 93 and the dump gate 94, only one of which is in the circuit at a time.

When the finger 82 is in its advanced position (Fig. 5, and the solid line position in Fig. 1) the contact point 61 rests against the contact point 41, and this is the position of the switch shown in solid lines in Fig. 2. At this time the motor of the vibrator 93 is in the circuit; the material 89 is shaken down into the pan 87.

When the material 89 in the pan 87 overbalances the weight 88 in the pan 86, the finger 82 is tripped as the pan 86 rises, and the switch is thrown into the dotted line position of Fig. 2, where the contact point 62 rests against the contact point 42. The vibrator 93 is then out of the circuit and no more material falls into the pan 87. (The same switch operation may be used to close a gate on a feed hopper, if desired.) The mechanism 94 which opens the dump gates is now in the circuit; the material 89 falls out of the pan 87, and the gates 94 are then automatically closed. If desired, the material 89 may be loaded directly from the pan 87 into sacks or boxes. At any rate, the gates 94 should operate swiftly enough to let all the material 89 out and close again before the pan 86 settles back on its rest 90.

The pan 86 may have a contact point 95 on its bottom, and the rest 90 may have at its top a contact point 96, so that when the pan 87 is raised from the rest 90, the contact point 95 is raised away from the contact point 96 on the rest 90, and a circuit is broken, as shown in Fig. 2. These points 95 and 96 may operate as a switch to control the circuit energizing the electromagnet 17, the wires 97 and 98 being attached, respectively, to the binding post 22 to the line 92. The line 99 leads from the binding post 21 to the line 91 on the opposite side of the A. C. circuit. Thus when the scale is tipped, the electromagnet circuit is broken, and there is no magnetic attraction of the armature 50 toward the contact point 27. When the material 89 has been dumped, and the pan 87 is again light, the pan 86 falls down on top of the rest 90, and the points 95 and 96 are again in contact. The electromagnet circuit is thus closed, and the armature 50 is instantly pulled against the contact point 27. The pusher 53 thus pushes against the pin 80 and moves the finger 82 to its advanced position, at the same time locking the pawl 81 against the latch plate 28. It will thus be seen how an endless series of weighing and packaging operations may be performed from an initial adjustment.

When a number of such switches are to be used in multiple to perform a series of operations, the binding post 25, instead of being connected back to the 110-volt line through the dump mechanism 94, may instead be connected to the common lead 24 in the next switch. In this type of series, the tripping of the finger 82 activates another switch 10 instead of the dump valve 94, and in this way several operations may be accomplished before restoration to the original position.

I claim:

1. A control switch, including in combination an electromagnet, an armature pivoted nearby to be attracted to said electromagnet, a fork on the moving end of said armature, a pivoted switch arm mounted nearby said armature and generally parallel to it, a lever pivoted to the moving end of said switch arm and extending between and beyond said fork, a pin passing through said lever near said fork and engageable by it, said pin being above the pivot point of said lever, a pawl on said lever, a latch bar adapted to be engaged by said pawl when said lever is pulled forward, a spring engaging said switch arm to retract said lever when said pawl is unlocked from said latch bar, and switch contacts engaged by said switch arm in its two positions, said spring urging said arm normally against one of said switch contacts, said electromagnet when energized moving (by means of the above-described linkage) said arm against the other switch contact, and said bar and pawl holding said arm in this position after de-energization of said electromagnet, until said pawl is disengaged from said bar.

2. A control switch including, a frame, an electromagnet supported by and insulated from said frame, an armature supported by said frame for swinging movement forward toward and back away from said electromagnet and adapted to be attracted toward said electromagnet upon its energization, a switch arm similarly supported by said frame back of said armature, stationary switch members supported by said frame at the limits of travel of said arm, spring means normally urging said arm back against the rear stationary switch member, a lever pivoted on said arm and linking said arm in tandem with said armature whereby when said armature is attracted by said electromagnet said arm is moved away from said rear stationary switch member and against the front stationary switch member, a pawl on said lever, and a latch supported by said frame against which said pawl may lock in forward position, holding said arm against said front stationary switch member after said electromagnet is de-energized until said pawl is released and said spring means urges said arm back against said rear stationary switch member.

3. The switch claimed in claim 2, in which said lever links said arm and armature in tandem only in forward movement of said armature.

4. The control switch claimed in claim 3, in which the tandem link is accomplished by a pin on the lever, and a pusher fork on said armature engages against said pin when moving forward.

5. The control switch claimed in claim 4, in which the pin is higher than the pivot point of the lever.

6. The control switch claimed in claim 4, in which there is an elongated finger on the lever, which, when lifted, unlocks the pawl from the latch, and is retracted by the spring so that it is removed from the line of motion of the mechanical actuation which lifted it.

7. The control switch claimed in claim 4, in which said pawl is lower than said pin.

8. An electric switch, including in combination with a frame insulated from all of the other elements of the switch through which current ever passes, a front stationary switch element and a rear stationary switch element supported by said frame, and a moveable switch element pivotally supported by said frame between said two stationary switch elements, the additional features of a spring normally urging said moveable element into contact with said rear stationary element, a lever pivoted on said moveable element, an armature linked to said lever during forward movement of said armature, a solenoid adapted when energized to attract said armature member, and thereby move said movable switch element out of contact with said rear stationary element and into contact with said front stationary element, a latch plate adjacent said solenoid, a pawl on said lever, engageable on said latch plate, and an extended finger on said lever, which when elevated, releases said pawl from said latch plate, and said spring moves said movable element back into contact with said rear stationary element, retracting said finger.

9. The device claimed in claim 8, in which the link between said lever and said armature is higher than the pivot point of said lever in said moveable switch element.

10. The device claimed in claim 9, in which said link consists of a pin on said lever and a forked pusher on said armature which engages said pin when said pusher is moved forward.

11. A control switch for alternately closing two electric circuits, said switch being set electromagnetically to close one of said circuits and adapted to open said circuit and close the other said circuit upon mechanical actuation, said switch including in combination a frame; an electromagnet supported by said frame; an armature supported by said frame for swinging movement toward and away from said electromagnet, said armature being adapted to be attracted toward said electromagnet upon energization thereof; two stationary switch members suppored by said frame, one being in each said two circuits; a moveable switch member supported by said frame adjacent said armature on the opposite side from said electromagnet, for swinging movement between said two stationary switch members so as to close one of said two circuits at each limit of its travel; pressure means normally urging said movable member against the one of said stationary members farther from said electromagnet; a stationary latch plate secured to said frame; and a linking bar secured to said movable member and operatively connected with said armature, whereby when said armature is attracted by energization of said electromagnet, said movable switch member is moved to open the switch farther from said electromagnet and close the switch nearer to said electromagnet, said linking bar having a latching dog adapted to engage said plate for holding said movable switch element in place so that it will remain closed against said nearer switch after said electromagnet is no longer energized, said linking bar also having a finger portion extending beyond said frame so that when said finger is displaced said latching dog is released from its latch plate and said spring moves said movable element back against said farther switch, at the same time retracting said finger from the line of motion of the displacing force at the outer end of said finger.

12. An electromagnetically-set and mechanically-released control switch for an electric circuit, including in combination an electromagnet; an armature moved upon energization of said electromagnet; a stationary switch element; a pivoted switch element movable between two positions to make and to break contact with said stationary element; means for urging said pivoted element normally into one of said two positions; a lost motion connection between said pivoted element and said armature, whereby said pivoted element is moved away from its said normal position to a second position when said electromagnet is energized; latching means pivotally mounted on said pivoted element for pivotal and linear reciprocating movement; a keeper for said latching means serving to retain said pivoted element in its said second position after deenergization of said electromagnet, said lost motion connection then allowing said armature to move independently of said pivoted element; and means for moving said pivoted element back to its said normal position upon release of said latching means from said keeper, said pivoted element then retracting said latch means from the linear path of the unlatching force.

ROBERT B. BROWN.

REFERENCES CITED

The following references are of record in the file of this patent:

UNITED STATES PATENTS

| Number | Name | Date |
|---|---|---|
| 645,902 | Sperry | Mar. 20, 1900 |
| 929,525 | Webb | July 27, 1909 |
| 1,158,355 | Willis | Oct. 26, 1915 |
| 1,180,549 | Siebenhauer | Apr. 25, 1916 |
| 1,288,820 | Braunwarth | Dec. 24, 1918 |
| 1,405,853 | Major | Feb. 7, 1922 |
| 1,498,813 | Smith | June 24, 1924 |
| 1,669,784 | Scofield | May 15, 1928 |
| 1,844,807 | Sorell | Feb. 9, 1932 |
| 1,899,000 | Johnson et al. | Feb. 28, 1933 |
| 1,990,068 | Gibson | Feb. 5, 1935 |
| 2,069,631 | Thomas | Feb. 2, 1937 |
| 2,131,034 | Beck | Sept. 27, 1938 |

FOREIGN PATENTS

| Number | Country | Date |
|---|---|---|
| 152,551 | Germany | June 24, 1904 |
| 302,543 | Italy | Oct. 31, 1932 |
| 321,699 | France | Jan. 16, 1903 |